United States Patent [19]

Domoto et al.

[11] Patent Number: 4,635,082
[45] Date of Patent: Jan. 6, 1987

[54] THERMO-OPTIC LIGHT MODULATION ARRAY

[75] Inventors: Gerald A. Domoto; Aron Sereny, both of Briarcliff Manor, N.Y.

[73] Assignee: Xerox Corporation, Stamford, Conn.

[21] Appl. No.: 823,977

[22] Filed: Jan. 30, 1986

Related U.S. Application Data

[63] Continuation of Ser. No. 611,457, May 17, 1984, abandoned.

[51] Int. Cl.$^4$ ............................................. G01D 15/14
[52] U.S. Cl. ..................................... 346/160; 350/356; 350/96.14; 346/108
[58] Field of Search ................... 346/107 R, 108, 160; 350/353, 355, 356, 96.13, 96.14

[56] References Cited

U.S. PATENT DOCUMENTS

| | | | |
|---|---|---|---|
| 3,499,112 | 3/1970 | Heilmeier et al. | 178/7.7 |
| 3,623,795 | 11/1971 | Taylor et al. | 350/150 |
| 3,848,087 | 11/1974 | Carrell | 178/7.6 |
| 4,047,797 | 9/1977 | Arnold et al. | 350/96 C |
| 4,281,904 | 8/1981 | Sprague et al. | 350/356 |
| 4,376,568 | 3/1983 | Sprague | 350/356 |
| 4,386,836 | 6/1983 | Aoki et al. | 355/3 R |
| 4,396,246 | 8/1983 | Holman | 350/96.14 |

FOREIGN PATENT DOCUMENTS

| | | | |
|---|---|---|---|
| 18930 | 1/1984 | Japan . | |
| 0074529 | 4/1984 | Japan | 350/353 |

OTHER PUBLICATIONS

Haruna et al, "Thermo-Optic Effect in LiNbO$_3$ for Light Deflection and Switching", *Electronics Letter*, Oct. 29, 1981, pp. 842-844.

"Deflecting of Light Beams", by Böer, Applied Physics Letters, vol. 16, No. 6, 15 Mar. 1970.

Article, "Optical Beam Deflection by Pulsed Temperature Gradients in Bulk GaAs", Proceeding of the IEEE (Correspondence), by S. G. Liu et al., May 1965, pp. 522-523.

Publication, "Light Switching Array for High-Resolution Pattern Generation", by B. Hill and K. P. Schmidt, pp. 169-174, Jul. 1982, in North American Philips Co. Product Survey.

*Primary Examiner*—Arthur G. Evans
*Attorney, Agent, or Firm*—Robert A. Chittum

[57] ABSTRACT

A thermo-optic light modulation array is disclosed for use in an imaging system of an electrophotographic printer to produce electrostatic latent images. The array comprises a light transmitting medium arranged in contact with an array of pixel shaped heaters which are selectively energized in response to digitized data signals for pulse heating the portions of the medium in vicinity of the heaters. Temperature gradients in the medium produced by the energized heaters cause changes in the index of refraction of the medium, so that selected portions of a sheet of collimated light directed through the temperature gradients in the light transmitting medium are deflected or modulated. The modulated light may be blocked by a stop and the unmodulated light may be directed to the precharged photoconductive member of the printer to form the latent images or visa versa. Several modes of light modulation are disclosed. In one mode, the light is directed through the medium just above and closely adjacent the heaters in a grazing fashion. A second transmissive mode directs the light through both the medium and transparent heaters, while a third reflective mode directs the light through the medium into reflective surfaces on the heaters. The reflective mode of modulation may be either for the production of linear, one-dimensional lines of picture elements or for the production of full two-dimensional alpha-numeric information. The other modes produce latent images one line of picture elements or pixels at a time.

13 Claims, 13 Drawing Figures

THERMO-OPTIC LIGHT MODULATION ARRAY

This is a continuation of application Ser. No. 611,457, filed May 17, 1984 abandoned.

BACKGROUND OF THE INVENTION

1. Field of the Invention

This invention relates to thermo-optic light modulation and more particularly to a thermo-optic image bar for the modulation of light passing through a transparent medium in contact with an array of heating elements. Selective pulse activation of the heating elements produces temporary temperature gradients in the medium in the vicinity of the activated element, thus changing the refractive index of the medium and modulating the light.

2. Description of the Prior Art

U.S. Pat. No. 3,848,087 to R. M. Carrell discloses a scanning system which utilizes a multifaceted mirror for deflecting a light beam over a scanning area. As successive mirror facets rotate into the path of an incident light beam, the beam repetitively sweeps across the scanning area. Such an application has utility in both raster input scanning (RIS) and in raster output scanning (ROS). In RIS, the light beam illuminates an original document line by line and enables the information contained in that document to be encoded through procedures well known in the art. For ROS, the moving light beam may be used to encode information onto an information carrying media, such as a charged photoconductive member of an electrophotographic printer. A scanning system must encode information into the light beam and must distribute that information across the photoconductive member. To accomplish the encoding of the information, prior art ROS systems typically intensity modulate the light beam at controlled intervals. As the beam scans the photoconductive member, the modulation dictates which areas will remain charged and which areas will discharge.

Experience with prior art scanning systems has shown that the movement of the light beam across a facet of a rotating mirror reduces the effectiveness of the scanning system. It is more efficient, if the light beam follows or tracks a center of a particular facet as that facet moves in relation to the light beam. To provide this so called facet tracking, the light beam must be deflected in space before it contacts the spinning mirror facet. These two ROS requirements of intensity modulation and deflection for facet tracking are satisfied by well known acousto-optic modulator devices.

U.S. Pat. No. 4,047,795 to Hughes et al recognizes the possibility of deflecting an incoming laser beam using an optical integrated circuit which includes control electrodes for deflecting the beam in a controlled manner. Thus, the disadvantage of relatively costly acousto-optic modulating devices which are effective only over a limited optical wavelength has been overcome.

U.S. Pat. No. 4,396,246 to R. L. Holman discloses an electro-optic wave guide for both intensity modulation and continuous deflection of an incident laser beam, all on the same substrate. It has particular utility when used with a ROS to facet track and thus to deflect an information encoded laser beam to a charged photoconductive member. The optical coupling techniques needed are simplified and require no optical coupling between beam deflection and beam intensity modulation devices.

Article by S. G. Liu and W. L. Walters entitled "Optical Beam Deflection by Pulsed Temperature Gradients in Bulk GaAs," *Proceeding of the IEEE* (Correspondence), May 1965, pp. 522–523, discloses optical beam deflection in GaAs by establishing a transient temperature gradient in the material, which gives rise to a corresponding refractive-index gradient normal to the direction of the incident beam.

U.S. Pat. No. 3,623,795 to G. W. Taylor discloses a system which includes a material whose optical properties change sharply in a small temperature range. The material is heat biased to a temperature close to this range and a beam of light is directed at the material. In response to a signal applied to the material, its temperature is changed to reach the critical temperature where the optical properties of the material sharply changes a characteristic such as deflection angle, polarization direction or the like.

U.S. Pat. No. 4,376,568 to R. A. Sprague discloses a thick-film, electro-optic modulator. A laser beam is focused into the modulator, the beam expanding sideways so that a sheet of collimated light is provided. The collimated light is affected by an electric field from an array of electrodes on one side of the modulator and a broad electrode on the other side. The light diffracted by this electrode set is reimaged onto a recording medium with the zero order diffracted light blocked out. Thus, each electrode of the array on one side of the modulator acts as a light modulator for one picture element on the output.

U.S. Pat. No. 4,281,904 to R. A. Sprague et al discloses a total internal reflection type of electro-optic device which has an array of electrodes individually addressed. To record the displayed signal pattern, the electro-optic device is imaged as a line onto a recording plane, so that each individually addressed element of the electro-optic device acts as a light modulator or gate for one picture element along the recording line.

U.S. Pat. No. 3,499,112 to G. H. Heilmeier et al discloses an electro-optic display having a layer of nematic liquid crystal material and an array of electrodes. Light is scattered because of turbulence in the layer created by the application of a voltage across the layer in the regions between the electrodes having the voltage applied thereto.

The prior art light beam modulators are generally of the acousto-optic or electro-optic types. However, liquid crystal materials have also been considered as light modulators as seen above in reference to U.S. Pat. No. 3,499,112. Full width array image bars which act as light valves are also well known. They generally comprise a linear array of transparent electrodes which are positioned on both sides of a material such as temperature autostabilizing nonlinear dielectric elements (TANDEL) used in U.S. Pat. No. 3,623,795 or liquid crystal materials discussed in U.S. Pat. No. 4,386,836 to K. Aoki et al. Each electrode pair in the linear array momentarily passes or modulates a small beam of light whenever that electrode pair is electrically addressed, so that each burst of light impinging on a moving, precharged photoconductive member of an electrophotographic printer represents a picture element or pixel composing the background region of the latent image. Therefore, the latent image is produced line-by-line via the image bar through the erasure of background changes.

The publication entitled "Light-Switching Array for High-Resolution Pattern Generation" by B. Hill and K.

P. Schmidt, pp. 169–174, July 1982, disclose a magneto-optic image bar called LiSA 512 Ehich is available from Amperex Electronic Corporation, Slaterville, R.I., an affiliate of North American Phillips. LiSA (Light Switching Array) is a chip consisting of a magneto-optic bismuth iron garnet film, grown epitaxially on a gadolinium gallium garnet substrate and etched into separate cells (refer to p. 170, FIG. 2). This film magnetizes spontaneously along an axis normal to the plane of the substrate. It exhibits the Faraday effect, so that plane polarized light passing through the cells are rotated, the sense of rotation depending on the direction of magnetization. In combination with an optical polarizer and analyzer, the cells effectively function as light valves controlled by the direction of magnetization (refer to FIG. 3). The LiSA chip uses a combination of heat and magnetic field pulses to switch the cells, thus passing short bursts of light in the typical image bar fashion. Since the film or chip is etched into relatively small cells, each cell will have uniform magnetization which resists changes in their magnetization, even against high magnetic fields for temperatures up to about 70° C. By applying a heat pulse above 70° C. to one or more of the cells followed with a magnetic field pulse, the cell magnetization can be switched from parallel to the direction normal to the chip substrate to non-parallel and vice versa. In FIG. 4 of this publication, a basic setup is shown, wherein a thin film resistive layer deposited on top of each light switching cell supplies the heat pulse and a separate winding around all the cells supplies the magnetic field pulse.

On page 171 of the publication, it is stated that the transmission coefficient varies with the wavelength of the transmitted light for both states of cell magnetization and that total blocking is only possible for monochromatic light of a specific wavelength. On page 172, it is stated that, in a practical printing system, the LiSA units would need a fiber optically coupled light source and a lens system to focus the light pattern onto a photoconductive member. Therefore, each cell on the chip would have to have its own individual fiber optic guide tube. Furthermore, all switching operations would be controlled by hybrid integrated circuits external to the LiSA chip so cooling would never be a problem.

The chief disadvantages of the prior art devices are that they are rather complex and expensive to manufacture. As will be seen below, a simple, cost effective full width array system or image bar which uses thermal energy pulses applied to a light passing medium in order to modulate light forms the basis of the present invention.

SUMMARY OF THE INVENTION

It is an object of the present invention to provide an improved image bar for an electrophotographic printer which utilizes linear arrays of heating elements in intimate contact with a transparent medium to form an array of dot shutters to produce electrostatic latent images on a moving, precharged photoconductive member of the printer, one row of picture elements or pixels at a time.

It is another object of this invention to energize selected heating elements in response to digitized data signals for predetermined time periods in order to apply thermal energy to the transparent medium in the vicinity of the energized heating element, so that the refractive index of the transparent medium is changed to modulate light passing therethrough.

It is still another object of this invention to provide an image bar for use in an electrophotographic printer to produce electrostatic latent images on a photoconductive member that is less complex and more cost effective to manufacture than other prior art image bars.

In the present invention, collimated light from a light source is passed through a lens system to produce and direct a sheet of light towards the photoconductive member of an electrophotographic printer. In one embodiment, transparent medium is mounted over and in intimate contact with a linear array of heating elements. The transparent medium and heating element array are positioned between the lens system and the photoconductive member, so that the sheet of light passes through the transparent medium and very close to the heating element. The heating elements are substantially parallel to the sheet of light and perpendicular to direction of the sheet of light. Means are provided to energize selected heating elements for predetermined time periods in response to digitized data signals, in order to apply bursts of thermal energy to the regions of the transparent medium in the immediate vicinity of the energized heating element.

The burst of thermal energy temporarily changes the refractive index of the transparent medium for a relatively short time to refract or modulate a segment of the sheet of light passing through the transparent medium. A stop or knife blocks all modulated portions of the sheet of light, while the unmodulated portions of the sheet of light continuously impinges on the moving, precharged photoconductive member. As is well known in electrophotography, electrostatic latent images are formed by exposing a precharged photoconductive member to light which discharges or erases the background areas of the image.

In another embodiment, the sheet of light enters the transparent medium and reflects off the heating elements, exits the transparent medium in a direction to pass by or through a stop, and then impinges on the photoconductive member. Selective energization of the heating elements modulate the light.

In an alternate embodiment of the reflective type modulator, the heating element array may be two dimensional. In this case, the light beam has sufficient thickness to project a two-dimensional image when the appropriate heating elements are energized. For electrophotography, unmodulated light, of course, erases the background region.

In a further embodiment, the sheet of light passes through a transparent linear array of heating elements normal to the direction of the light. The heating elements are on the surface or embedded in the surface of a transparent medium, so that unmodulated light impinges on the photoconductive member, selective energization of the heating elements prevents the portion of light passing through that heating element from striking the photoconductive member. The transparent electrode is preferably configured in a grating pattern for reasons discussed below.

DESCRIPTION OF THE PREFERRED EMBODIMENT

Figure 1:
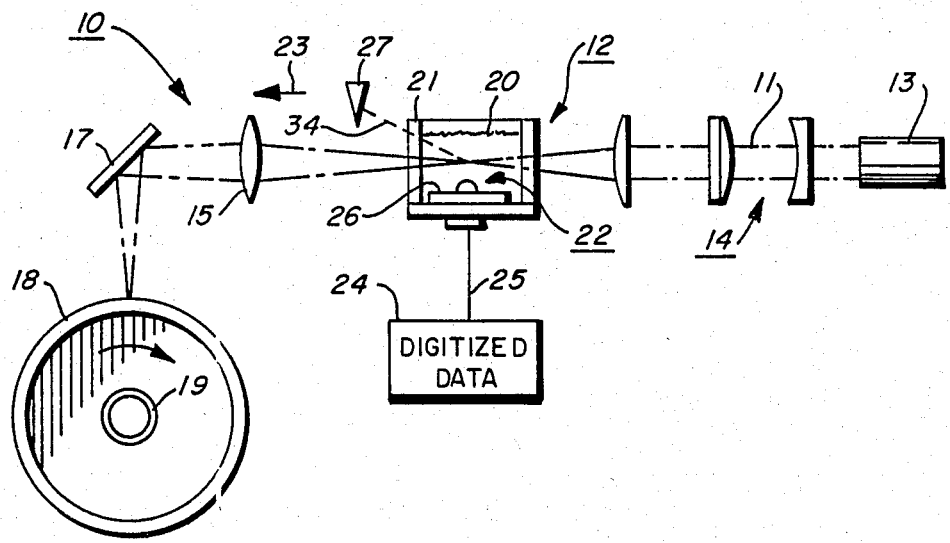
FIG. 1 is a schematic diagram of a side elevation view, partially sectioned, of an electrophotographic printer imaging system showing the thermo-optic light modulation array or image bar of the present invention.
Figure 2:
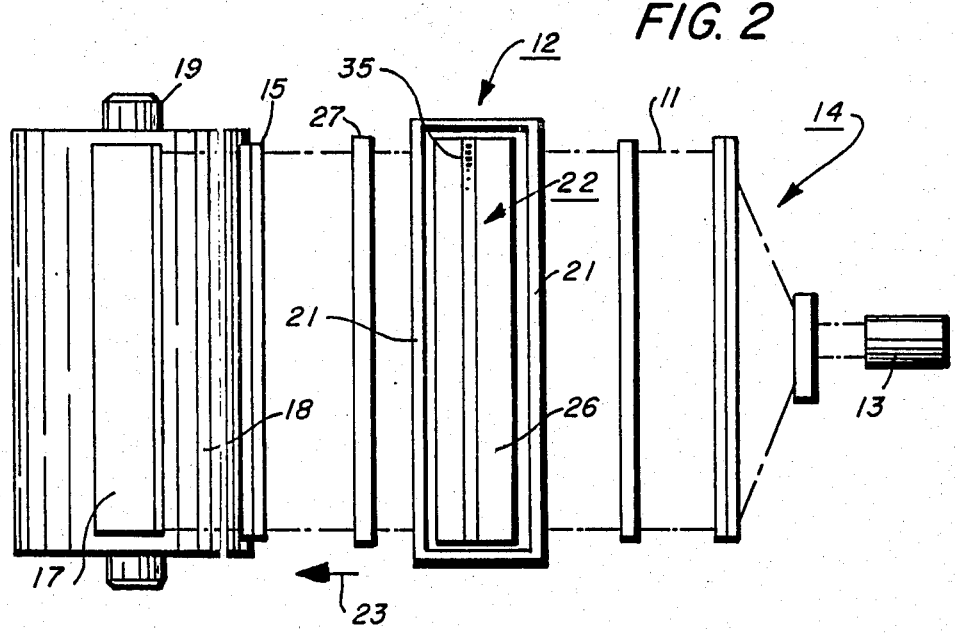
FIG. 2 is a schematic diagram of a plan view of the imaging system of FIG. 1.

In FIGS. 1 and 2, there is shown an imaging system 10 suitable for an electrophotographic printer and arranged in accordance with the present invention. For clarity, only the photoconductive member 18 of the electrophotographic printer is shown, with all of the usual process stations removed; viz, the latent image erasing and precharging station, the development station, the transfer station and the cleaning station are omitted. Although the embodiment of FIGS. 1 and 2 depicts the photoconductive member as a cylindrical drum, various other configurations (not shown) could be used, such as, for example, an endless belt configuration.

The imaging system 10 comprises a light source 13 which must emit or be adaptable for emitting collimated light. One convenient source of collimated light is a laser and that is the light source used in the preferred embodiment. An input lens system 14 comprises a system of lenses to convert the collimated light into a plane of light and to a focal line in close proximity to the line of heating elements. In this embodiment, the plane or sheet of light is focused on the photoconductive member as a focal line parallel to the axis 19 of photoconductive member 18 by an output lens system 15. A mirror 17 reflects the sheet of light onto the photoconductive member at a predetermined position on the surface thereof; in FIG. 1, this is the twelve o'clock position, but this is, of course, discretionary, for the output lens system 15 could focus the light directly on the photoconductive member.

Located between the input lens system 14 and the output lens system 15 is a thermo-optic light modulation array 12, also referred to as a thermo-optic image bar. The modulation array or image bar comprises a transparent medium 20 positioned above and in intimate contact with a linear array of heating elements 22. The sheet of light is intercepted by the transparent medium and the sheet of light is transmitted therethrough, unincumbered on its way to the photoconductive member via the output lens system. The transparent medium may be solid such as, for example, a plastic material or it may be liquid, such as, for example, water or methanol. If the transparent medium is liquid, it must be sealingly contained by walls 21. The walls which are perpendicular to the direction of the sheet of light, as shown by arrow 23, are also transparent.

Voltage is selectively applied to the individual heating elements 35 of the array 22 for a predetermined time period through conduit 25 from an electronic controller or a microprocessor 24 in response to receipt of digitized data from a source such as a character generator, CCD scanner at a document scanning station, or a computer (none shown). Localized, rapidly developed temperature gradients are produced in the transparent medium by the transfer of thermal energy pulses from the heating elements to the transparent medium. The momentary temperature gradients imposed in the transparent medium by the thermal energy pulses changes the refractive index of the transparent medium and deflects or modulates that small segment of the sheet of light passing through the temperature gradient. The modulated light segments 34 shown in dashed line are blocked by stop or knife 27.

As is well known in electrophotography, the electostatic latent image is formed by directing light onto the precharged background regions of the latent image to remove the charges in the background region, thus leaving the image areas charged and available for development with oppositely charged developer or toner particles.

Figure 5A:
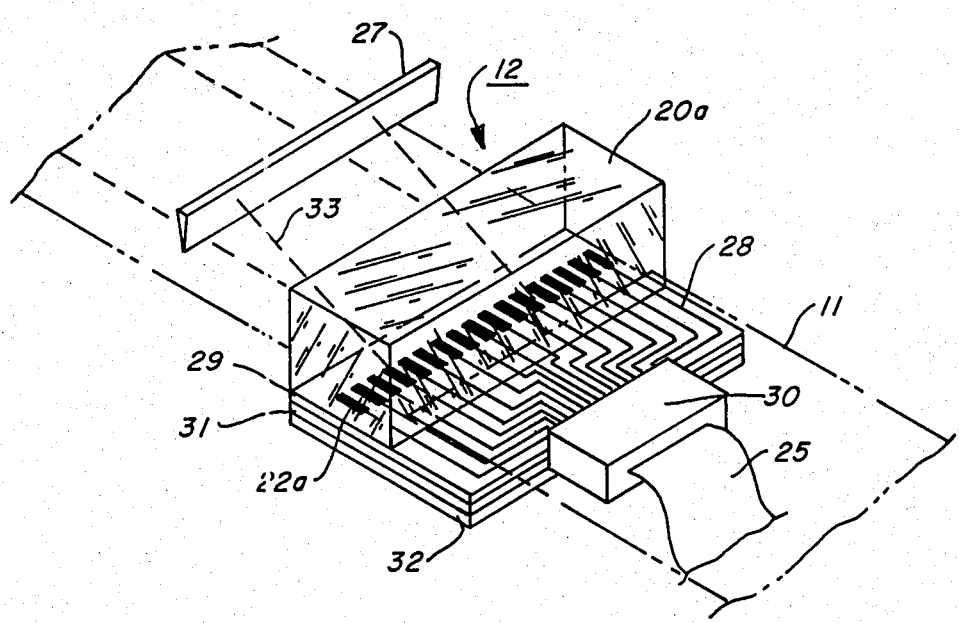
FIG. 5a is a schematic perspective of an alternate embodiment of the thermo-optic image bar of FIG. 1, showing a solid transparent medium such as plastic material instead of a liquid transparent medium.

For efficient light modulation by the image bar 12, the sheet of light should pass very close to the heating elements 22 and be parallel thereto. The heating element array preferably should be perpendicular to the direction of the sheet of light as indicated by arrow 23. A standard thermal printhead 26 may be used, such as, for example, a Rohm KH 653 thermal printhead which was used to demonstrate the modulation of the sheet of light in the configuration of FIG. 1. For a higher efficient, full width image bar, a customized linear array of heating elements comprising resistors and addressing electrodes may be formed on an insulating substrate photolithographically. Refer to FIG. 5a, discussed later, for a perspective view of a custom made array of heating elements 22a on a dielectric substrate 29 and a solid transparent medium such as plastic 20a.

Figure 3A:
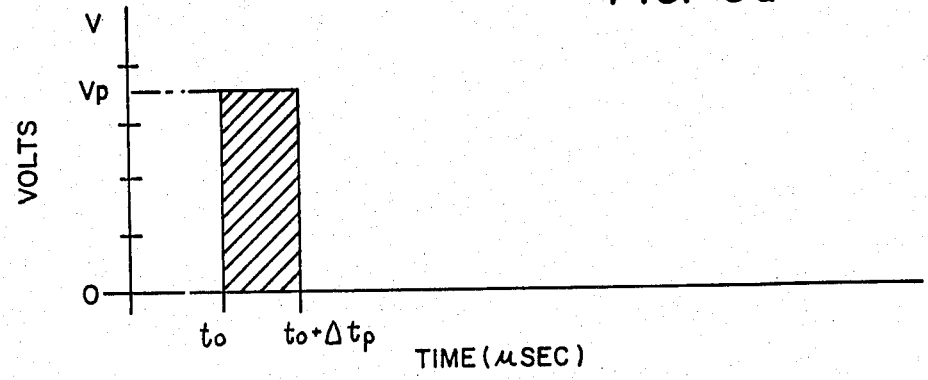
FIG. 3a is a graphical plot of the voltage applied to a typical heating element or dot shutter of the image bar showing the driving voltage as a function of time.

A representative voltage pulse applied to a one of the heating elements 35 is graphically illustrated in FIG. 3a.

Figure 3B:
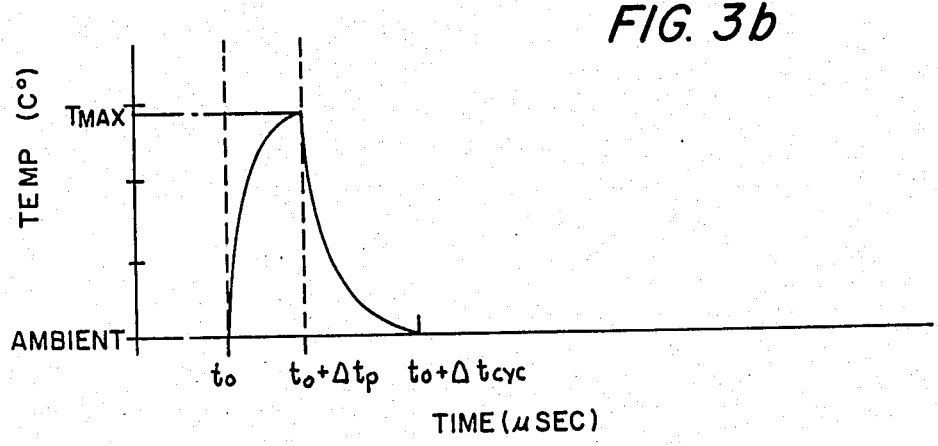
FIG. 3b is a graphical plot of the temperature within the transparent medium directly over the heating element.
Figure 3C:
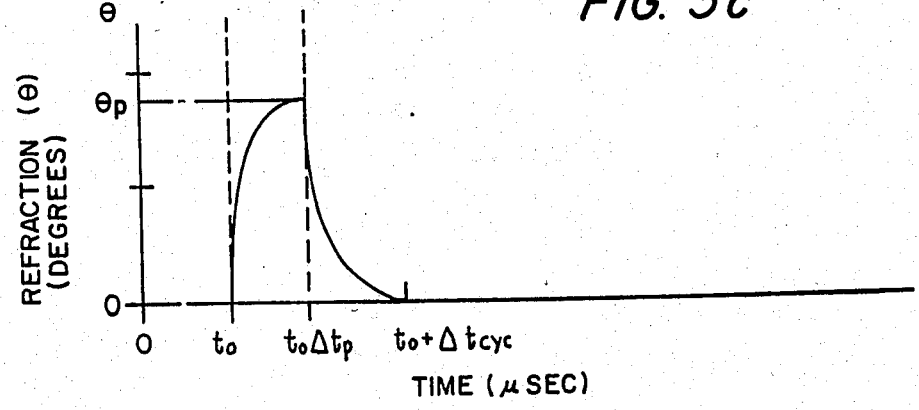
FIG. 3c is a graphical plot of the degree of refraction of the portion of the sheet of light passing through the heated portion of the transparent medium of FIG. 3b.

In the preferred embodiment, a peak voltage $V_p$ is applied at time $t_o$ for a pulse duration of $\Delta t_p$ microseconds to produce a temperature in the medium directly over the heating element as shown in FIG. 3b, with peak temperature of $T_{max}$. The temperature gradient in the portion of the transparent medium 20 directly over the applicable heating element is shown in FIG. 3b. The thermal energy from the heating element, during the application of the voltage pulse, to the transparent medium causes the localized temperature gradient shown in FIG. 3b. The refractive index of the heated portion of the transparent medium changes, resulting in refraction or modulation of the portion of the sheet of light passing therethrough. FIG. 3c shows the degree of modulation for one cycle. The maximum deflection $\theta_p$ in degrees is reached at time $t_o + \Delta t_p$.

With a FIG. 1 embodiment using a Rohm KH 653 thermal printhead sold by the Rohm Corporation having a 24 heating element array, a voltage $V_p$ in the range of 3.5 to 8 volts produced a temperature $T_{max}$ in a transparent medium of methanol directly over the energized heating element of 80° C. Alphanumeric electrostatic latent images were produced on a photoconductive member moving at 6 inches per second with this thermo-optic image bar configuration using the following parameters.

$V_p = 3.5$ volts
$\Delta t_p = 200$ microseconds down to 75 microseconds
$= t_{cyc} = 100$ Hz at $\Delta t_p = 200$ microseconds up to 1600 Hz at $\Delta t_p = 75$ microseconds When a liquid transparent medium is used, the parameters of voltage $V_p$, pulse duration time $\Delta t_p$, and cycles of application of the voltage pulses $\Delta t_{cyc}$ must be selected to provide modulation without boiling the transparent medium (i.e. without permitting the occurrence of medium phase change). Additionally, the parameters used must not overheat the heating elements, a temperature of which was specified by the printhead manufacturer, Rohm Corporation. The same constraints must be observed if the transparent medium is a solid, except the phase change not permitted is the melting of the solid material.

FIG. 5a, as mentioned above, depicts a perspective schematic view of a thermo-optic light modulation array 12 having a solid transparent medium 20a, such as plastic, residing on a photolithographically produced resistor array 22a and electrodes 28 on dielectric substrate 29. The electrodes 28 individually connect the resistors of the array 22a to pins in pin connector 30 at the edge of the substrate 29. An electrically conductive layer 31 is formed on the surface of the substrate opposite to the one having the resistors and electrodes. The conductive layer, for example, aluminum, serves as a common return for the voltage applied to the resistors via buried contacts 38 (see FIG. 5b) through the substrate 29. The conductive layer is passivated by a dielectric layer 32 such as silicon dioxide. Alternatively, a bus electrode may be used as the common return and it may be on the bottom surface of the dielectric substrate or on the top surface. The voltage is selectively applied to individual resistors in the array 22a from the electronic controller 24 (see FIG. 1) via conduit 25.

The sheet of light 11 shown in dashed line is transmitted through the solid transparent medium 20a. Temporary temperature gradients caused in the transparent medium by the selectively addressed resistors modulate small segments 33 of the sheet of light and cause them to be deflected and blocked by stop 27. Thus, only the unmodulated portions of the sheet of light 11 impinge on the photoconductive member 18 (refer to FIG. 1).

Figure 4A:
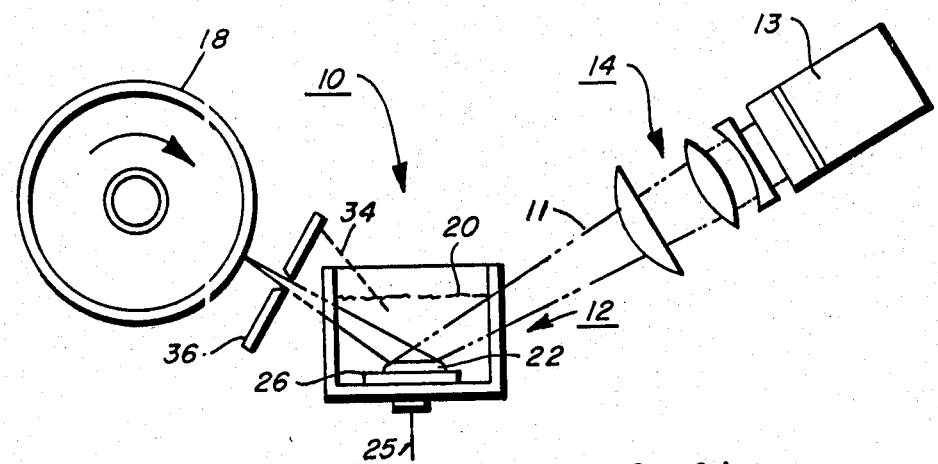
FIG. 4a is a schematic diagram of an elevation view, partially sectioned, of an alternate embodiment of the thermo-optic image bar of FIG. 1 wherein the sheet of light is reflected off of the heating element array.
Figure 4B:
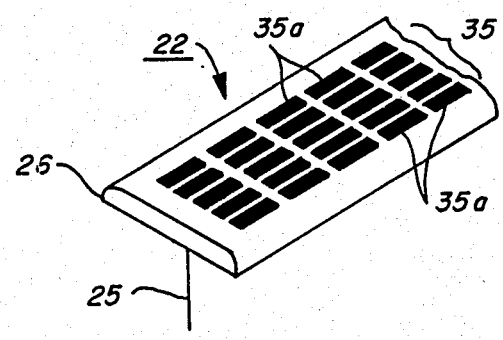
FIG. 4b is an alternate embodiment of the heating element array of the thermo-optic image bar of FIG. 4a showing each heating element as having a grating-type pattern.
Figure 8A:
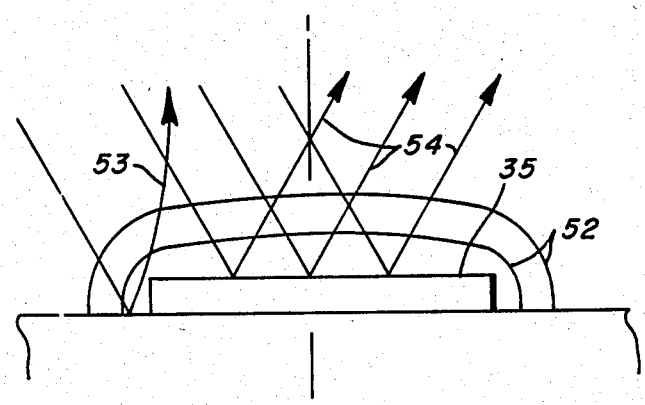
FIG. 8a is a schematic, cross-sectional side view of a typical heating element of the reflective type depicted in FIG. 4a showing temperature gradients which refract some of the reflected light.
Figure 8B:
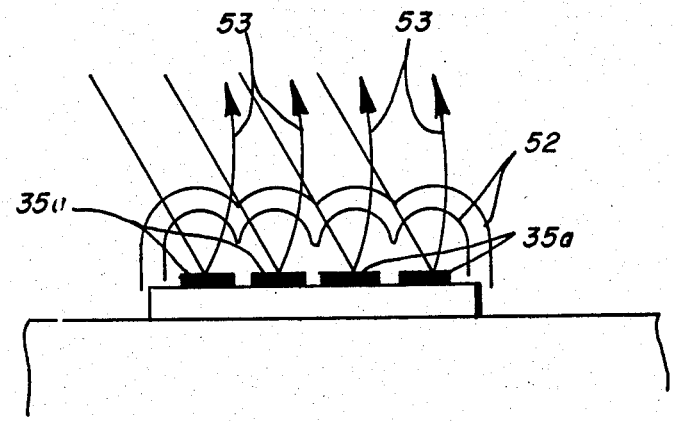
FIG. 8b is a schematic, cross-sectional side view of an improved heating element of the reflective type shown in FIG. 4b having a grating-type pattern which produce different temperature gradients that refract all of the reflected light.

An alternate embodiment of the imaging system 10 is shown in FIG. 4a, where the difference between it and the embodiment of FIG. 1 is that the sheet of light 11 is directed to the heating element array 22 which are in this case highly reflective and the reflected and unstopped light is focused on the photoconductive member as a focal line without the need of the output lens system 15. Alternatively, the input lens system 14 could focus the unstopped portions of sheet of light as a focal line at a location intermediate the photoconductive member and the modulation array 12 whereat an optical system (not shown), such as, for example, a selfloc lens, receives and focuses the light on the surface of the moving photoconductive member. Energization of selected heating elements 35 in the heating element array 22, via conduit 25 in response to digitized data, locally heat the transparent medium, as in the embodiment of FIG. 1, to modulate the portion 34 of the sheet of light passing through the temporary temperature gradients. The modulated light portions 34 are blocked by slit aperture 36. Each reflective heating element 35 in the heating element array 22 will more efficiently modulate the reflected light if it is patterned in grating type configuration having a column of individual, reflective heating subelements 35a as shown in FIG. 4b. Each column of heating subelements 35a are commonly pulse energized. The sheet of light directed toward the array of heating elements patterned as columns of heating subelements generally impinge on one or more of the subelements in each column. Therefore, the tolerances required to focus and direct the sheet of light onto the reflective heating elements is much lower, since any and all of the subelements will provide the reflection and modulation. This thermal optical grating type construction for each heating element makes use of temperature gradiants parallel to the element surface and permits a faster system. This is because a smaller cycle time between energy pulses $\Delta t_{cyc}$ is possible, since the temperature gradients around each subelement are generated in smaller geometric volumes of transparent medium. In addition, temperature gradients in the transparent medium at any instant in time which surround the larger solid heating elements modulate only at the edge of the heating elements where the gradient shapes provide different entrance and reflected exit paths for the light. If all light is directed over the central portion of the elements, no effect of overall temperature profile is present, as discussed below with respect to FIG. 8a. Refer to FIG. 8a, where a schematic cross-sectional side view of one solid heating element 35 is shown during time $t_o + \Delta t_p$. Temperature gradient lines 52 surround the heating element. The light represented by vectors 53 are modulated while the vectors 54 are not modulated because the entrance and exit gradient paths of vectors 54 are substantially equal. FIG. 8b shows a schematic, cross-sectional side view of a grating type construction of an heating element comprised of a column of heating subelements 35a. Temperature gradient lines 52 which surround the subelements provide entrance and exit paths which are different, so that the light vectors 53 are not symetrically reflected and are thus modulated any where across the subelements in contrast to the solid configuration of FIG. 8a where only the light vectors 53 at the edges of the heating are modulated.

A single linear row of very small heating element would work equally as well as the linear array of columns of subelements, but would require very tight assemblying tolerances for the light source, input and output lens systems, and the thermo-optic modulator to focus the sheet of light on such a small linear target of heating elements. Vibration isolation would have to be provided also since such a closely toleranced arrangement would be very susceptible to ordinary electrophotographic printer operation vibration and may cause the sheet of light to fluctuate from its focused position, i.e., jitter.

Figure 5B:
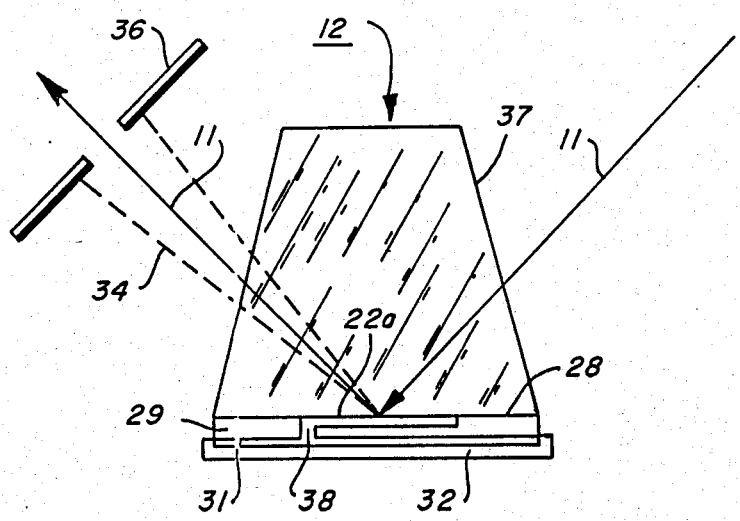
FIG. 5b is an alternate embodiment of the thermo-optic image bar of FIG. 4a, showing a solid transparent medium such as a plastic material instead of a liquid transparent medium.

FIG. 5b is a cross-sectional side view of the image bar 12 depicting the embodiment of FIG. 4a modified to have a cross-sectionally shaped solid transparent medium in the form of a trapezoid. The shape of the solid transparent medium is, of course, a matter of design expediency and within the discretion of the designer of the image bar. Rather than the thermal printhead 26 of FIG. 4a, a custom made array of surface embedded resistors 22a are formed as in FIG. 5a having electrodes 28, buried contacts 38 to a conductive layer 31, such as aluminum, serving as a common return. The common return is passivated by silicon dioxide layer 32. The sheet of light 11 is reflected from the array of resistors 25 which are highly reflective through slit aperture 36. The thermally modulated portions 34 of the sheet of light is blocked by the slit aperture.

Figure 6:
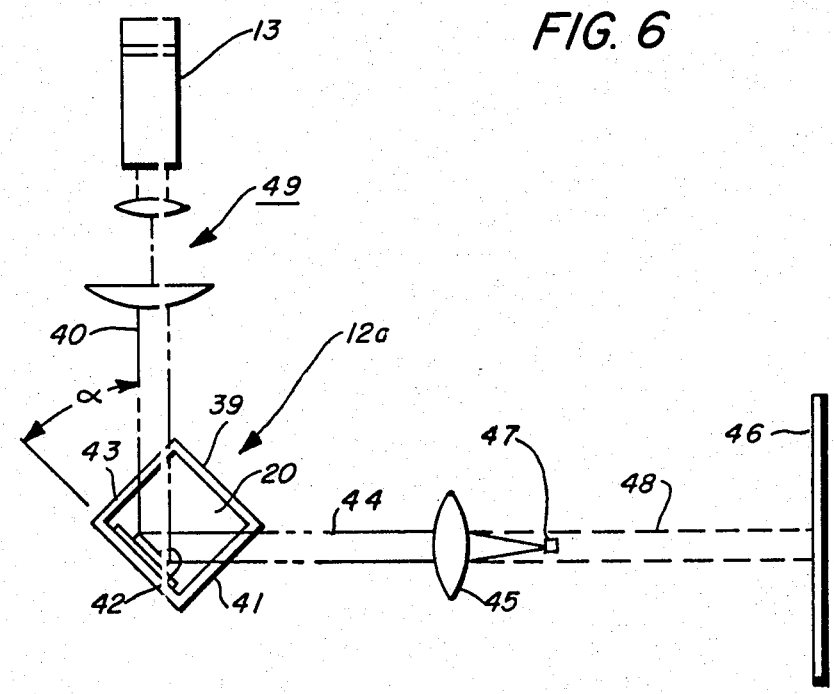
FIG. 6 is an alternate embodiment of the imaging system of FIG. 4a wherein a two dimensional image is displayed at an image plane instead of a line of picture elements or pixels.

Another embodiment of the present invention is shown in FIG. 6. In this Figure, a two dimensional light modulation array is disclosed. As in the arrangement of FIG. 4a, localized temperature gradients imposed in a light transmitting medium are developed by electrical pulse heating of pixel shaped heaters which are arranged in a two dimensional array, such as any well known commercially available two dimensional thermal printhead, to modulate light thermo-optically. Each reflecting type heating element 42 should have the thermal optical grating type construction of FIG. 4b, for the same reasons discussed before in reference to FIGS. 8a and 8b. The light transmitting medium, which may be solid or liquid, is placed in contact with the two dimensional heating elements or pixel array. As in the other embodiments, large temperature gradients produced in the light transmitting medium by electrically pulsing of selective heating pixels in the array, produce large local gradients in the index of refraction of the medium. Light suffering reflecting from the pixel surfaces is redirected or refracted because of the index of refraction gradient developed over each heated pixel during the heating pulse. Light reflected from unheated pixels is unaffected.

In FIG. 6, a beam of collimated light 40, large enough to cover the two dimensional array of heaters 42, is produced by laser 13 and beam expanding lens system 49. The beam is brought into the modulation cell 12a through optical windows 43 with any convenient angle of incidence ($\alpha$) with respect to the two dimensional thermal head. The modulation cell 12a contains the light transmitting medium 20 as well as the two dimensional heater array which is flat and highly reflecting. The collimated beam 40 after reflection off the surface of the two dimensional heater array 42 passes out of the exit window 41 of the modulation cell as a reflected, collimated beam 44. Schlieren optics are used to obtain an image of the modulation pattern. A lens or lens system 45 is placed in the exiting light path. The optics used have sufficient depth of field so that a sharp image of the entire heater array may be produced in the image plane 46. Since the light reflected from the heater array surface is collimated in the absence of modulation, all of this unmodulated light passes through the back focal point of the lens (or lenses). A stop 47 is placed at this back focus point to intercept all unmodulated light 44. Modulation results from the fact that light reflected from the heat element (pixel) surfaces suffers deflection due to the index of refraction gradients resulting from electrical heating pulses. The direction of the uncollimated deflected beam 48 can be made to differ substantially from the reflected but undeflected collimated beam. This uncollimated light 48 reflected from those heaters which are electrically pulse heated no longer passes through the back focal point of the lens and thus is not intercepted by the Schlieren stop. The modulated or uncollimated light passes through the lens and forms an image with one to one correspondence to the two dimensional pattern of pixel elements which are pulse heated. By appropriate lens systems, any magnification or reduction in the size of the projected image can be accomplished.

An experimental demonstration of the embodiment of FIG. 6 was conducted using a helium neon laser 13, a test modulation cell 12a consisting of an aluminum body 39 supporting parallel optical windows 41, 43, and a commercially available two dimensional array thermal printer from a Silent 700 Electronic Data Terminal sold by Texas Instruments (TI) of Dallas, Texas. A beam expanding lens 49 directs a collimated beam onto the two dimensional heater array 42 of the thermal printer and a simple convex lens 45 and a simple stop 47 blocked all unmodulated, reflected light. Using a character generator such as one from the TI Silent 700, images of either upper or lower case letters as well as numbers were generated at the image plan 46 via the keyboard of the thermal printer (not shown). This embodiment can produce any type of two dimensional, digitized image.

For use in electrophotography, an arrangement similar to the image system of FIG. 6 could be used, with one change, as an annotator to xerographically add information to a reserved portion of the main electrostatic latent image. For example, the words "confidential information" and the like may be added to an electrostatic latent image by flash exposing a two dimensional message on the photoconductive member 18. In this configuration, the one change is that the stop 47 is replaced by a spatial filter (not shown) so that unmodulated light beam 44 is passed by the spatial filter or pin hole and the modulated light beam 48 is blocked. A shutter (not shown) opens and closes as desired to flash expose the two-dimensional image on the photoconductive member in a position reserved in the latent image area. The thermally modulated light beam 48 is blocked. In order to flash expose the two dimensional message or annotation from modulation cell 12a in time relation to the reserved position in the prerecorded electrostatic latent image, the shutter (not shown) is opened and closed by a typical, well known timing or sensing means also not shown. The means for reserving the position in the image area on the photoconductive member may be by any well known technique to block the light used to form the latent image, so that this precharged area is not erased.

Figure 7:
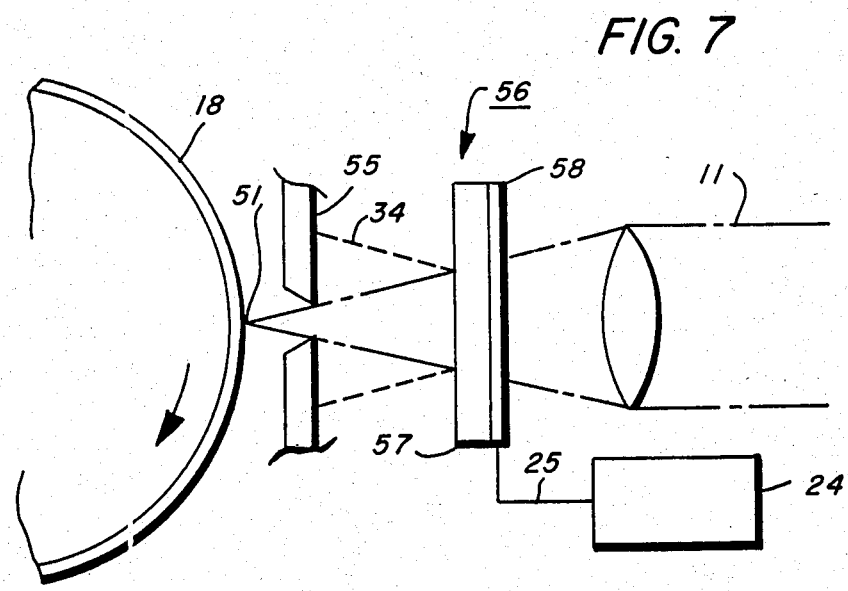
FIG. 7 depicts another embodiment of the present invention wherein the array of heating elements are transparent and normal to the sheet of light, so that unmodulated light is transmitted therethrough while selectively heated portions of the transparent medium on one side of the heating element array refracts and modulates the light.

Another embodiment of the present invention is shown in FIG. 7. A sheet of collimated light 11 is focused and directed as a focal line 51 on the moving photoconductive member 18 through a thermo-optic modulation array 56 and slit aperture 55. The modulation array comprises, for example, a film 57 of transparent material, such as plastic, and a transparent dielectric substrate 58 on which a linear array of transparent resistors preferably having a grating pattern (not shown) are formed. The resistors are positioned in intimate contact with the transparent film 57. The resistors are selectively pulse heated via conduit 25 and controller 24 in response to digitized data signals received in a manner similar to that discussed with reference to the arrangement in FIG. 1. Temperature gradients are produced by the pulsed resistors and cause local gradients in the index of refraction of the film portions contacting the pulsed resistors. Portions of the sheet of light being transmitted through the transmissive thermo-optic modulation array are refracted and deflected as these light portions encounter thermal gradients in the film. The embodiment of FIG. 7, could alternatively focus the unstopped portion of the sheet of light at a location intermediate the modulation array 56 and the moving photoconductive member 18 whereat a different lens system (not shown), such as a selfloc lens arrangement, receives the unstopped light and focuses it as a focal line on the surface of the photoconductive member.

In recapitulation, the present invention relates to the application of thermo-optic effects to light passing through a light transmitting medium that is locally pulsed heated to create local transient gradients of the index of refraction of the medium. The light passing through the temperature gradient of the medium is refracted, thus modulating it. These temperature gradients may be developed by electrical pulse heating of a linear array of pixel-shaped heaters to modulate the light. A light transmitting or transparent medium is positioned on and in contact with the heater array and may be either liquid or solid such as, for example, methanol or plastic. The large local temperature gradients produced in the transparent medium by electrically pulsing selected heaters in the array result in large gradients in the index of refraction of the medium. These gradients are primarily in a direction normal to the heating surfaces of the heaters. Light traveling over the heater surfaces or through the transparent heaters is redirected or deflected because of the index of refraction gradient developed in the transparent medium contacting each heated heater element during each heating pulse. Light passing over or through unheated heaters is not deflected.

One embodiment consists of a thin plane of collimated light directed parallel to the heater surfaces. In this configuration each portion of the beam passes over a predetermined heatable pixel shaped heater in a grazing fashion. At the exit path from the modulator, a knife edge or slit is positioned such that any deflected portion of the beam would not be transmitted.

Another embodiment consists of pixel size mirror surfaces deposited over each heater. Light reflected from the pixel mirrors would suffer deflection due to the index of refraction gradients resulting from electrical heating pulses. The direction of the deflected beam can be made to differ substantially from the reflected but undeflected beam. The output of the modulator can be masked with a slit or knife edge so that the deflected beam will not be transmitted. The heater surfaces may be in a single linear array or a two-dimensional array. For either reflective type or transmissive type thermo-optic modulator, each heater is preferably configured in a patterned arrangement having a grating pattern, i.e., a column of several small subheaters commonly energized.

A further embodiment is a transmissive thermo-optic modulator having transparent resistors mounted on a transparent medium such as a plastic film. The pulsed resistors with grating pattern causes a temporary change in the index of retraction field which is periodic in space, thus modulating the light passing therethrough.

Many modifications and variations are apparent from the foregoing description of the invention and all such modifications and variations are intended to be within the scope of the present invention.

We claim:

1. A thermo-optic light modulation array for use in an electrophotographic printer to produce electrostatic latent images on a moving, precharged photoconductive member of the printer comprising:
   a source of collimated light;
   a first lens means for converting the collimated light into a sheet of unpolarized light and for directing the sheet of light in a path toward the photoconductive member, said first lens means focusing the sheet of light as a focal line at a first location intermediate the light source and photoconductive member;
   a transparent homogeneous medium being positioned in the light path to intercept the sheet of light and being adapted to transmit the sheet of light therethrough, the transparent medium location being such that the focal line first location of the sheet of light is within the transparent medium;
   a linear array of selectively energizable thermal heating elements positioned adjacent the transparent medium and in intimate contact therewith, so that the linear array of heating elements is substantially perpendicular to the direction of the sheet of light, the heating elements providing means for selectively applying thermal energy pulses to predetermined portions of the transparent medium in response to digitized data signals, so that the refractive index of said transparent medium is changed in those portions receiving the thermal energy to modulate portions of said sheet of light passing therethrough;
   the focal line of the sheet of light being parallel to and located above but very close to the linear array of heating elements, so that said unmodulated sheet of light passes through said transparent medium substantially parallel with and closely adjacent the heating element array in a substantially grazing fashion while the modulated portions of the sheet of light are substantially entirely deflected;
   stop means to block alternatively either the modulated or unmodulated portions of the sheet of light; and
   a second lens means for focusing said unblocked portions of the sheet of light exiting the transparent medium as a second focal line on the surface of said photoconductive member, so that the modulation array functions as an optical image bar which produces an electrostatic latent image on the photoconductive member one line of picture elements at a time by discharging the precharged region that form the background areas of the latent image.

2. A thermo-optic light modulation array for use in an electrophotographic printer to produce electrostatic latent images on a moving, precharged photoconductive member of the printer comprising:

a source of collimated light;

lens means for converting the collimated light into a sheet of unpolarized light and for directing the sheet of light on the photoconductive member as a focal line;

a transparent, homogeneous medium being positioned in the light path to intercept the sheet of light;

a linear array of selectively energizable thermal heating elements, each heating element in said heating element array having a highly reflective surface positioned adjacent the transparent medium and intimate contact therewith, the linear array of heating elements being substantially perpendicular to the direction of the sheet of light, the heating elements providing means for selectively applying thermal energy pulses to predetermined portions of the transparent medium in response to digitized data signals, so that the refractive index of said transparent medium is changed in those portions receiving the thermal energy to modulate portions of said sheet of light passing therethrough;

the lens means directing the sheet of light through a portion of the transparent medium and towards the reflective surfaces of the heating elements, so that the sheet of light impinges on and is reflected from the reflective surfaces of the heating elements prior to exiting from the transparent medium; and stop means to block alternatively either the modulated or unmodulated portions of the sheet of light exiting from the transparent medium after reflecting from the surfaces of the heating elements, so that the sheet of light exits the transparent medium in a manner such that the unstopped portions thereof are directed to and focused on the surface of the photoconductive member as said focal line or portions thereof, so that the modulation array functions as an optical image bar which produces the latent image on the photoconductive member one line of picture elements at a time.

3. The modulation array of claim 2, wherein the lens means focuses the unstopped portion of the sheet of light which exits the transparent medium as a focal line at a location downstream of the stop means and intermediate the modulation array and the photoconductive member; and the modulation array further comprising an optical system at said focal line location to direct and refocus the unstopped portion of the sheet of light on the surface of the photoconductive member for the purpose of forming the latent image thereon.

4. The modulation array of claim 2, wherein each heating element and respective reflective surface of said array of heating elements have a commonly energizable series of subelements which form a grating pattern that more effectively modulates the light impinging thereon when that particular heating element is momentarily energized.

5. The modulation array of claim 4, wherein the series of subelements which form the grating pattern is a column of individual subelements that are commonly energizable, each subelement having its own reflective surface.

6. The modulation array of claim 2, wherein the linear array of heating elements is a two-dimensional array of selectively energizable thermal heating elements; and wherein the lens means directs the sheet of collimated light through the transparent medium and into contact with the reflective surfaces of the two-dimensional array of heating elements, said sheet of light impinging on the heating element reflective surfaces at an angle with a plane parallel and coincident with the heating element array, so that the reflected sheet of light exits the transparent medium and is directed through an imaging lens and then a spatial stop instead of use of said stop means, the cross-sectional area of the sheet of light being of sufficient size to cover the reflective surfaces of the two-dimensional array of heating elements, when it impinges and reflects therefrom, so that the unmodulated portions of the sheet of light are reflected from the unenergized heating element reflective surfaces into and through an imaging lens and spatial stop and thus the unmodulated light portions are imaged onto the photoconductive member.

7. The modulation array of claim 6, wherein each heating element and reflective surface comprise a commonly energized column of closely spaced subelements which form a grating pattern that more efficiently modulates the light impinging thereon when the particular heating element grating pattern is energized.

8. The modulation array of claim 1, wherein the transparent medium may be a solid or a liquid.

9. The modulation array of claim 1, wherein the transparent medium is perpendicular to the direction of said sheet of light and extends for the full width thereof, so that the sheet of light may be transmitted therethrough;

wherein the linear array of heating elements for selectively applying thermal energy pulses to said transparent medium is a linear array of transparent heating elements extending along the width of the transparent medium and in intimate contact therewith, said heating element array being alternatively located on either side of the transparent medium in which the sheet of light passes through, and wherein the first lens means focuses the sheet of light through the transparent medium and transparent heating element array and onto the photoconductive member as a focal line instead of within the transparent medium, so that the second lens means is not required.

10. The modulation array of claim 9, wherein each transparent heating element is a series of commonly energizable transparent subelements which form a grating pattern that more effectively modulate the light passing therethrough when each heating element is selectively energized.

11. The modulation array of claim 2, wherein the transparent medium may be a solid or a liquid.

12. A thermo-optic light modulation array for use in an electrophotographic printer to produce electrostatic latent images on a moving, precharged photoconductive member of the printer comprising:

a source of collimated light;

a first lens means for converting the collimated light into a sheet of unpolarized light and for directing the sheet of light in a path toward a transparent, homogenous medium being positioned in the light path to intercept the sheet of light;

a linear array of selectively energizable thermal heating elements, each element in said heating element array having a highly reflective surface positioned adjacent the transparent medium and in intimate contact therewith, the linear array of heating elements being substantially perpendicular to the sheet of light, the heating elements providing means for selectively applying thermal energy pulses to predetermined portions of the transparent medium in response to digitized data signals, so that the refractive index of said transparent medium is changed in those portions receiving the thermal energy to modulate portions of said sheet of light passing therethrough, each heating element and respective reflective surface of said array of heating elements comprising a commonly energizable series of separate subelements which form a grating pattern;

the first lens means focusing the sheet of light through the transparent medium at a first focal line on and substantially parallel to the linear array of heating element reflective surfaces, the focal line of light thus impinging on some of the reflective surfaces of the subelements of each of the heating elements and being reflected therefrom prior to exiting from the transparent medium and being directed toward the photoconductive member, whereby the combination of focusing the sheet of light on the reflective surfaces of the heating elements as a focal line and each heating element being composed of a series of commonly energized subelements provide more effective modulation of the portions of the sheet of light that impinge the selectively energized heating elements than single solid heating elements and do so without the need of accurate alignment of the focal line on the heating elements; and stop means to block alternatively either the modulated or unmodulated portions of the sheet of light, so that an electrostatic latent image is created on the photoconductive member by the unblocked portions of the sheet of light impinging on said photoconductive member to cause the discharge of the precharged regions that form the background areas of the latent image.

13. The modulation array of claim 12, wherein a second lens means focuses the unblocked portion of the sheet of light which exits the transparent medium as a second focal line at a location on the surface of the photoconductive member for the purpose of forming the latent image thereon.

* * * * *